United States Patent [19]

Gabritsos et al.

[11] Patent Number: 4,570,250
[45] Date of Patent: Feb. 11, 1986

[54] OPTICAL SOUND-REPRODUCING APPARATUS

[75] Inventors: George C. Gabritsos, Astoria, N.Y.; Trevor J. Marshall, Jr., Westport, Conn.

[73] Assignee: CBS Inc., New York, N.Y.

[21] Appl. No.: 495,570

[22] Filed: May 18, 1983

[51] Int. Cl.$^4$ ............ G11B 7/08; G11B 7/18; G11B 7/24

[52] U.S. Cl. .................. 369/97; 369/64; 369/125; 369/124; 369/112

[58] Field of Search ............ 358/199, 202, 205, 289, 358/292, 293, 294; 369/13, 64, 93, 97, 68, 124, 125, 112

[56] References Cited

U.S. PATENT DOCUMENTS

| | | | |
|---|---|---|---|
| 2,059,550 | 11/1936 | Champion | 369/97 |
| 2,379,438 | 7/1945 | Hogan | 358/293 |
| 2,681,382 | 6/1954 | Hilburn | 369/97 X |
| 3,108,160 | 10/1963 | Maurer | 369/97 |
| 3,243,522 | 3/1966 | Maurer | 369/97 |
| 3,370,133 | 2/1968 | Bender | 369/97 |
| 3,816,652 | 6/1974 | Barnett | 358/294 X |
| 3,970,803 | 7/1976 | Kinzie, Jr. et al. | 369/97 X |
| 4,178,615 | 12/1979 | Shimooka et al. | 358/302 |
| 4,180,306 | 12/1979 | Duhrkoop et al. | 358/199 X |
| 4,286,293 | 8/1981 | Jablonowski | 358/199 |
| 4,495,523 | 1/1985 | Ozawa | 358/293 |

FOREIGN PATENT DOCUMENTS 28561 of 1907 United Kingdom ............ 369/97

Primary Examiner—Raymond F. Cardillo
Assistant Examiner—Wayne Young
Attorney, Agent, or Firm—Spencer E. Olson

[57] ABSTRACT

A system for generating audible information from a sound track printed on paper by conventional printing techniques, the sound track consisting of a multiplicity of closely-spaced parallel sound track segments which are curved in a manual scanning direction and oriented generally transverse the manual scanning direction. Also provided is an optical scanner adapted to be manually moved along the sound track in the manual scanning direction, the scanner including means for automatically and continuously sequentially scanning the segments longitudinally to produce electrical signals representative of sound information contained in the sound track, and means for converting the electrical signals into audible sound.

19 Claims, 16 Drawing Figures

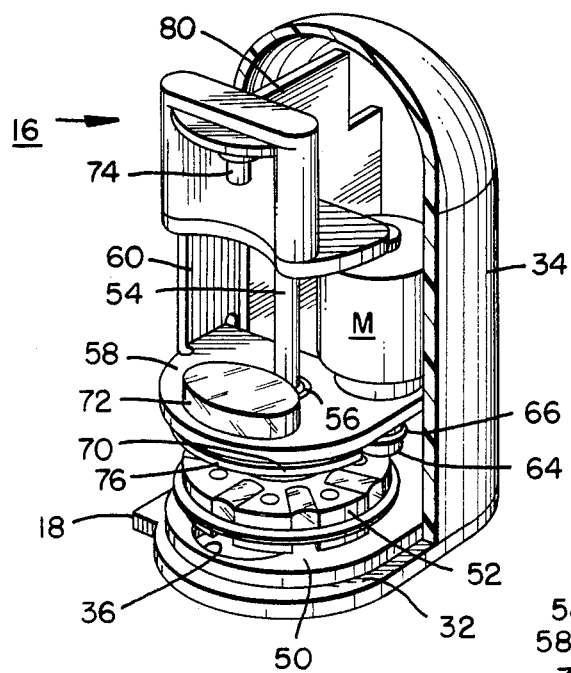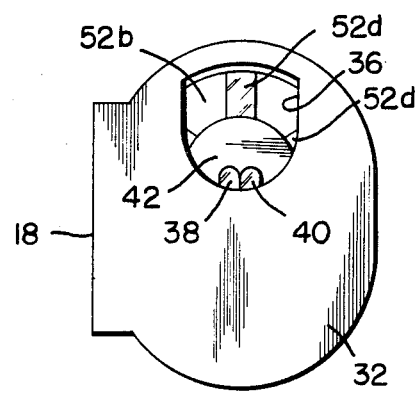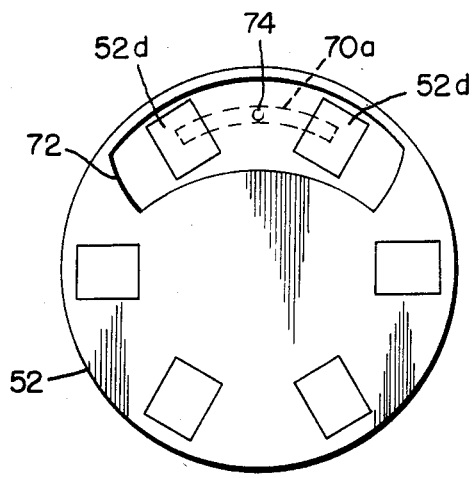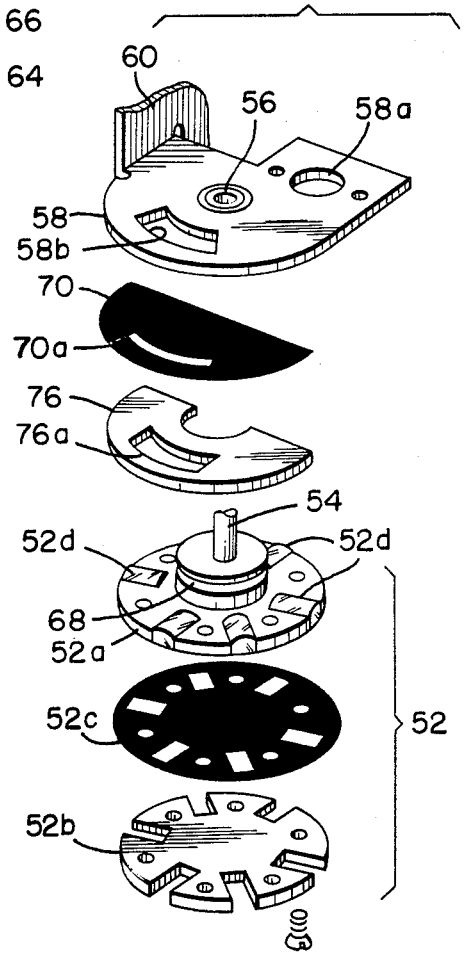

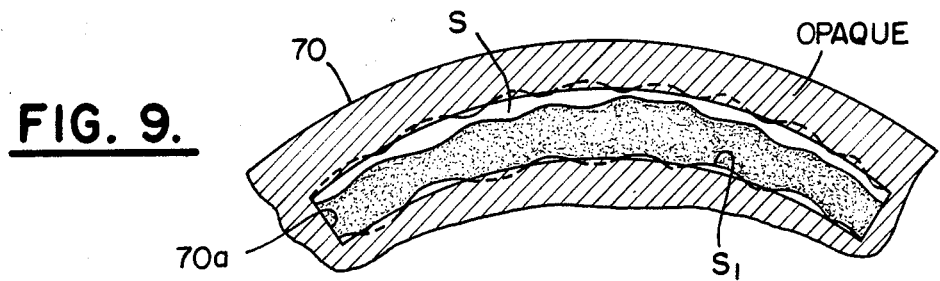
FIG. 9.
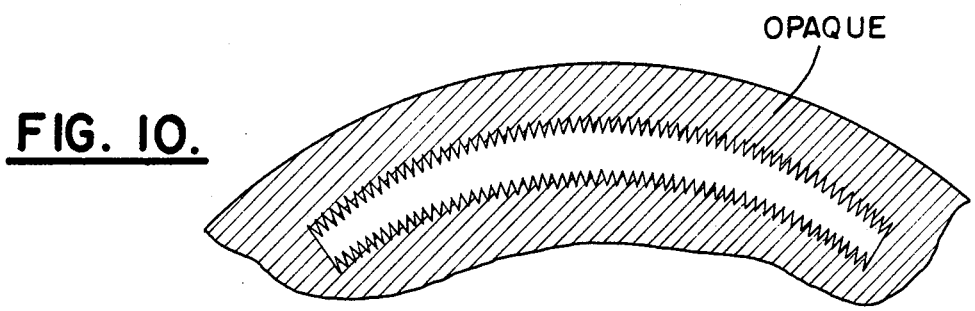
FIG. 10.
FIG. 13.
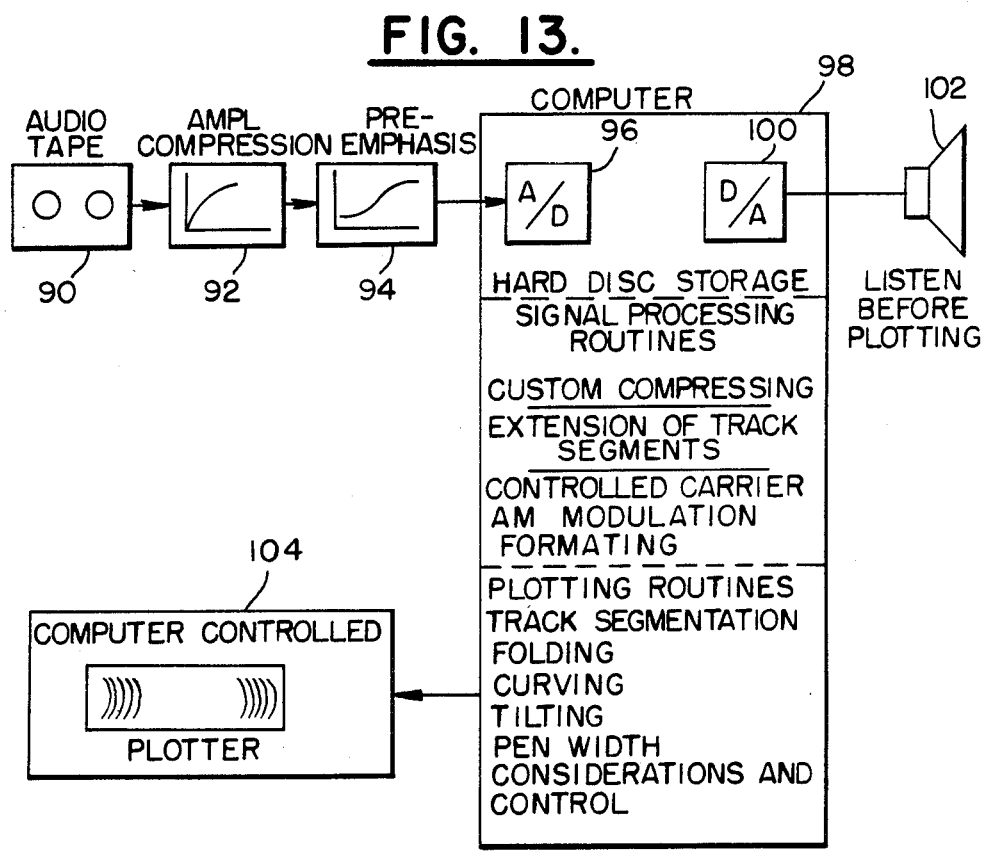

OPTICAL SOUND-REPRODUCING APPARATUS

BACKGROUND OF THE INVENTION

This invention relates to printed sound and, more particularly, to a system for generating audible information from indicia printed on paper.

Attempts have heretofore been made to produce a commercially viable "talking book" which would offer the reader, typically a child, audible guidance concerning pictures and words presented on a printed page. The potential educational and amusement advantages of combined audio/visual presentation from a book are well documented. However, previously suggested techniques have not been commercially accepted primarily because of the expense of providing an acceptable audio recording media in book or sheet form and less than satisfactory intelligibility of the sounds reproduced from the recording media with a transducer of modest cost.

Commonly assigned U.S. Pat. No. 3,970,803 granted July 20, 1976 to George R. Kinzie Jr. and Daniel A. Gravereaux, describes a system for generating audible information from indicia printed on paper which can be printed in ink by conventional printing techniques. A sound track printed on the paper is oriented in a manual scanning direction, this being the horizontal direction in most cases, the track consisting of a multiplicity of straight, closely parallel-spaced sound track segments of the variable-area type oriented in a direction generally transverse the manual scanning direction. The segments are arranged in an order which represents sequential portions of the complete sound information contained in the track, with adjacent segments having a substantial degree of waveform redundancy. The sound tracks are printed on the pages of a book, for example, in association with sentences of printed text to which the sound information contained in the printed sound tracks corresponds.

The "folded" printed sound track is transduced with an optical scanner adapted to be manually moved along the sound track in the manual scanning direction, the scanner including mechanical and optical means which automatically scan the track in a direction transverse the manual scanning direction, namely, along the length direction of the sound track segments. The segments are scanned longitudinally at a rate to obtain a signal of desired amplitude and pitch, which rate is not significantly dependent on the manual scanning rate, so the frequencies of individual sound elements are relatively insensitive to changes in the manual scanning rate.

The patented scanning apparatus includes a housing having a smooth bottom surface adapted to rest on the paper over the sound track, the bottom having a transparent opening through which an area of the sound track is illuminated by a lamp mounted within the housing. An opaque enclosure, mounted above the transparent opening, has a narrow, elongated window confronting the transparent opening, and a photodetector supported in the enclosure receives light entering the window and converts it to a sound-representing signal. A toothed wheel supported for rotation about a vertical axis is positioned between the transparent opening and the window, the teeth (six in the disclosed embodiment) being so proportioned that a given tooth completely tranverses the window and masks a portion thereof before the next-appearing tooth begins to traverse the window. That is, the teeth are spaced such that only a single tooth area at a time masks the window, and a new tooth begins traversal of the window just as the previous tooth is completing its traversal. In this type of scan, the average amount of light viewed by the photo-detector through the window (in the absence of the scanning tooth) is a constant reference which is a function of the window width, and variations in the amount of light "blocked out" by the scanning tooth at any instant represents the varying audio signal.

While this prior art scanner produces generally acceptable sound signals, because the sound track segments are straight and the toothed scanning wheel has a relatively small diameter, effects occur which deleteriously affect the intelligibility of the reproduced sound, one being the introduction of phase modulation of the signal from tooth to tooth; this phase modulation and other distortions would be minimal if the tracks were scanned with a very large diameter wheel. Another problem, due to the window being sufficiently wide as to encompass and thus play back as many as two or three adjacent segments simultaneously, is the occurrence of nulls at certain frequencies related to the scanning frequency, manifested as echoes in the reproduced sound signal. Additionally, the frequency response of the scanner is dependent on the physical width of the scanning tooth that traverses the window; if the tooth is relatively wide, as it needs to be from a structural viewpoint, the response of the system to high frequency components in the sound information is less than desirable. Although the frequency response could be improved by narrowing the tooth and thus the width of the scanning slit, the improvement would be at the expense of system gain because of the resulting reduction in the effective area of the scanning slit, and, as a consequence, the variations in the light reaching the photodetector.

A disclosed alternative to the toothed wheel is a circular disk having a multiplicity of radially extending rectangular apertures whereby only a small portion of the track segment is viewed (rather than blocked out) at a time. A scanner with this type of scanning wheel, because of its relatively small diameter and the straight sound tract segments, exhibits the same kinds of problems as those introduced by a toothed scanning wheel.

OBJECTS AND SUMMARY OF THE INVENTION

The primary object of the present invention is to provide an improved printed sound track system for generating audible information from indicia printed on paper or the like which overcomes the disadvantages of prior systems.

The present invention is directed to an improved system for generating audible information from a printed sound track, the sound track being oriented on the paper in a manual scanning direction, which is horizontal in most instances. The track consists of a multiplicity of sound track segments printed on paper or other medium in closely-spaced parallel arrangement and oriented in a direction generally transverse the manual scanning direction; however, the sound track in the present system differs from that of the earlier system in the important respect that the segments are curved in the manual scanning direction with a predetermined radius of curvature related to the structure of an improved optical scanner for transducing information from the printed sound track.

An optical scanner in accordance with the invention, adapted to be manually moved along the sound track in the manual scanning direction, includes a housing having a flat bottom surface adapted to rest on the printed surface, the bottom having a transparent aperture through which a limited area of the soundprint is illuminated and light is reflected from the soundprint. The segments of the sound track are scanned by optical scanning apparatus including a rotatable scanning wheel having a plurality of slot apertures each fitted with a cylindrical lens for collimating reflected light incident thereon, a mask having a narrow arcuate transparent window which is traversed by the collimated light beam as the wheel is rotated, and a spherical lens for concentrating light transmitted by the window onto a photodetector, which produces an electrical output signal representative of the audio information contained in the printed sound track. Each cylindrical lens of the scanning wheel defines a narrow scanning line which enhances the high frequency response of the system, and gives the system a higher efficiency than prior systems by reason of its capability of accepting a greater amount of light for transmission to the photodetector. The system also exhibits less scanning noise than the previous system.

Other objects, features and advantages of the invention will become evident, and its construction and operation better understood, from the following detailed description when taken in conjunction with the accompanying drawings.

BRIEF DESCRIPTION OF THE DRAWINGS

FIG. 3 is a perspective view, partially cut away, of a preferred embodiment of an optical scanner constructed in accordance with the invention;

FIG. 3a is a bottom plan view of the optical scanner of FIG. 3;

FIG. 4 is an exploded perspective view showing the construction of the scanning wheel and other optical elements of the optical scanner of FIG. 3;

FIG. 5 is a plan view looking down from the top of FIG. 3 showing the geometrical relationship between elements of the optical scanning system;

FIG. 9 is an enlarged fragmentary plan view of a mask showing a geometrical relationship between sound track and window which causes harmonic distortion;

FIG. 10 is an enlarged fragmentary plan view of another alternative form of mask;

FIG. 13 is a simplified block diagram of a system for recording sound tracks in accordance with the invention.

DESCRIPTION OF THE PREFERRED EMBODIMENT

Figure 1:
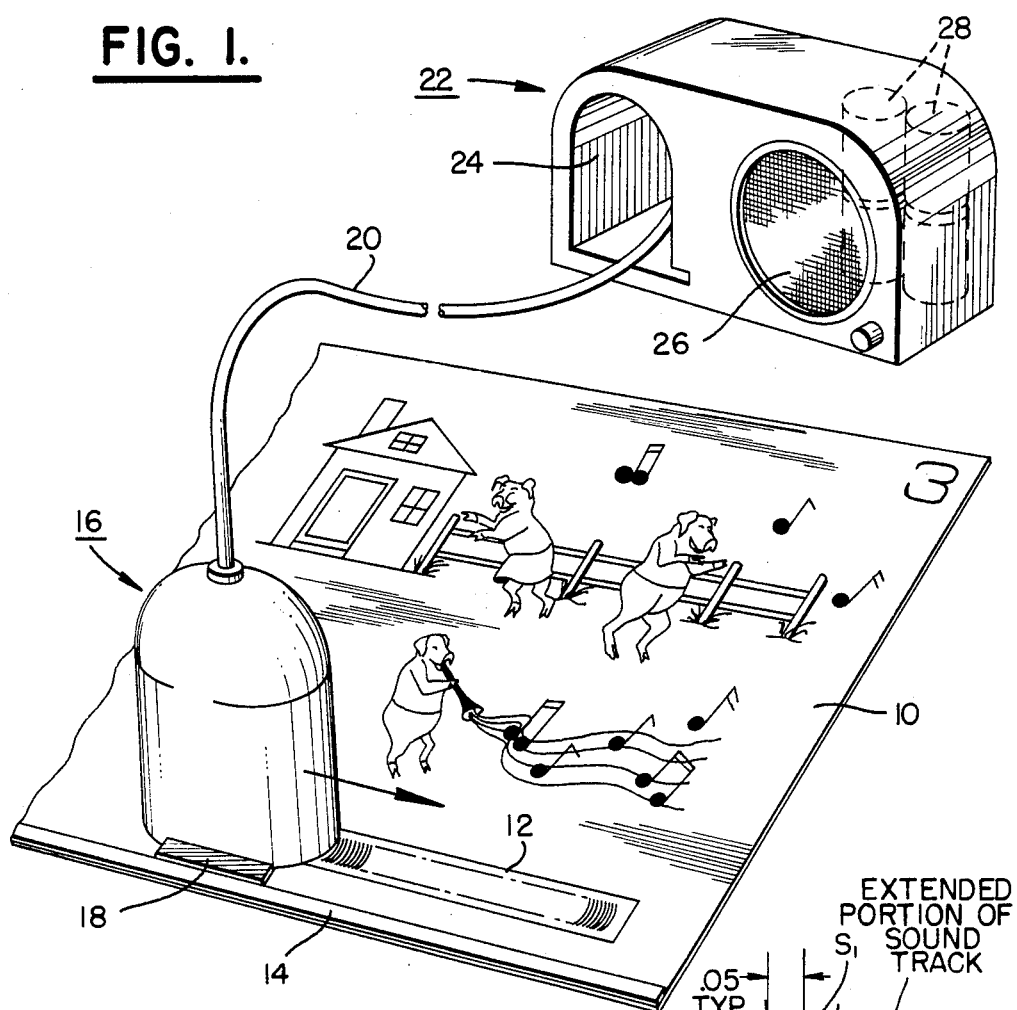
FIG. 1 is a perspective view of a portion of a page in a children's book on which sound tracks in accordance with the invention are printed and showing the optical scanner in operative relationship with the sound track.

Referring to FIG. 1, there is shown a portion of a page 10 of a child's book on which is printed a sound track 12 containing audio information which when reproduced produces audible information related to the pictorial information presented on the page. The illustrated page is from a book intended to teach numbers to a pre-school child and may, for example, have the audible message "Three Pigs A'Dancing" recorded in the printed sound track 12. This message may, if desired, be printed on the page above the sound track in step with the printed sound track, so that when the printed recording is reproduced, the user will hear a speaker pronounce the words printed above the soundprint. The recorded speech message can be recorded in any language, and because this is a sound reproduction system (not speech synthesis), the character and inflection of the speaker's voice is preserved. Alternatively, animal sounds or various kinds of sound effects can be recorded. The printed sound track, which typically is slightly more than one-half inch wide and five to eight inches long as determined by the length of the message, is positioned with its long axis parallel to the lower edge of the paper which desirably has a guide 14 affixed thereto to insure that the optical scanner 16 provided to reproduce the recorded information is maintained in alignment with the printed sound track 12 as it is manually moved therealong from left to right. The housing of the optical scanner 16 has a straight guide 18 at its lower edge which engages the guide 14 as the scanner is moved along the long axis of the sound track, hereinafter termed "the manual scanning direction."

In the illustrated embodiment, the optical scanner 16 is connected via a cable 20 to a remote console 22 having a recess 22 formed therein for securing scanner 16 when it is not in use, a loudspeaker 26 for audibly reproducing electrical signals transduced by the scanner, and batteries 28 for supplying power to the scanner and to the audio signal processing circuitry, part of which is contained in the scanner 16 and the balance of which is contained in console 22.

The format of the printed sound track is similar to the cross-scan format used on video tape, which makes it possible to scan through the recorded information at different rates without changing the pitch of the reproduced audio signals, and consists of a multiplicity of segments arranged closely parallel to each other in the manual scanning direction and oriented generally transverse the manual scanning direction. Adjacent track segments are arranged such as to produce signals representing continuous audio information when the segments are consecutively scanned longitudinally by the scanning apparatus 16. A fragment of a sound track is shown approximately full size in the left-hand portion of FIG. 2, and the right-hand portion shows two segments greatly enlarged to illustrate the sound track geometry. The individual segments are of the variable-area type wherein the width of the track segment at any point along its length varies in accordance with signal amplitude at that point. For convenience of illustration within the constraints imposed by the availability of only black and white, the track segments are shown in the left-hand portion as being black on a white background; however, since operation of the scanning apparatus depends on variations in the light reflected from the variable-area track segments, in the preferred embodiment the track segments are much more reflective than is the medium on which they are printed, and typically are printed white on black. The track segments are curved in the manual scanning direction with a one-half inch radius of curvature and are spaced closely parallel to each other, a spacing between segments of 0.05" being typical. The individual tracks are oriented generally transversely of the manual scanning direction, represented by the central axis 30 of the sound track, departing from true transverse in the respect that the track segments are angled slightly from the vertical to axis 30. More particularly, it will be noted that the lower extremity of the segment labeled S is displaced in the scanning direction from its upper extremity by an amount equal to the spacing between adjacent track segments (i.e., 0.05'), causing a "tilt" of about 4.06° with respect to a line drawn perpendicular to manual scanning axis 30. As will be seen, this orientation of the sound track segments improves the intelligibility of the audio signals reproduced from the sound track as the optical scanner 16 is moved therealong.

To allow for some mispositioning of the scanner with respect to the central axis 30 of the sound track, the sound information is recorded in a manner as to provide a substantial degree of redundancy between adjacent segments. The basic sound information to be reproduced is recorded along a central arc (unshaded) which typically is approximately one-half inch long and subtends an angle of about 60°, and the shaded portions to either side of the central portion, each typically about 0.10 inch long, contain information which also appears in the next adjacent segment. That is, the shaded upper starting portion of segment S contains the same information as is recorded at the exit end portion of the next preceding segment, the unshaded central portion contains the information required to reproduce its portion of the total recorded message, and the shaded exit portion contains information that is also recorded in the shaded starting end of segment $S_1$. Thus, a portion of the information contained in each segment is repeated in the next adjacent segment, this redundant information allowing some mispositioning of the reader relative to the center line of the sound track while retaining a high degree of intelligibility in the reproduced sound.

The described printed sound track is adapted to be manually scanned in a first direction by the scanning device 16 which contains an optical scanner which automatically scans the track segments in a direction generally transverse the manual scanning direction. By successively optically scanning the track segments along their length at an appropriate rate, a signal of desired pitch and amplitude is obtained. In the present optical scanning device the rate at which individual track segments are scanned longitudinally is relatively insensitive to the rate at which the scanner is manually moved in the manual scanning direction, so the frequencies of individual sound elements are not particularly sensitive to changes in the manual scanning rate; consequently, the system provides a high degree of intelligibility over a wide range of manual scanning rates, an important advantage in a device to be used by a young child. This aspect is also useful in language studies, or any case where slower or faster than real time playback is desired.

Referring now to FIGS. 3, 3a and 4, the improved scanning apparatus has a generally oval base 32 provided with a straight guiding edge 18 along one side thereof, and has a removable cover or housing 34, a portion of which is shown cut away to reveal the optical system contained therein. The underside of the base 32 has a smooth flat surface and, as best seen in FIG. 3a, is opaque except for an aperture 36 centrally positioned on the long axis of the base near its forward end. The base may be formed of sheet metal, for example, having a cutout to form the aperture, or, alternatively, it may be formed of glass or plastic material that is opaque except for the area of the aperture. A light source, in the form of a pair of "grain of wheat" lamps 38 and 40 mounted on the upper surface of base 32, and a reflector 42 supported above the lamps together direct light downwardly which substantially uniformly illuminates the area of the soundprint lying below aperture 36. When the scanner is properly guided in use, the aperture 36 straddles the printed sound track and light reflected from the soundprint through the aperture enters the optical system of the scanner. The arcuate-shaped aperture 36 has a curvature comparable to that of the sound track segments (but is not tilted), a length comparable to the length of the segments, and a width sufficient to encompass at least one sound track segment.

The optical scanning apparatus is supported within housing 34 on a base 50, which, in turn, rests upon and is supported on the upper surface of base 32. Base 50 has an arcuate-shaped opening therein conforming to the shape of aperture 36 through which light reflected from the soundprint enters the scanning system. Positioned parallel to and slightly above the upper surface of base 50 is a scanning wheel 52 supported on the lower end of a vertically oriented shaft 54 for rotation in a plane substantially parallel to the undersurface of base 32. Shaft 54 is rotatably supported in a bushing 56 which is seated in a horizontally-oriented platform 58 secured to an upstanding support structure 60. Scanning wheel 52 is driven in rotation by a small electric motor M mounted on platform 58 with its shaft extending downwardly through an aperture 58a to which a pulley 64 is attached and coupled by a belt 66 to a pulley 68 secured on shaft 54. In the presently preferred embodiment, a 2,000 rpm D.C. motor and the described belt/pulley reduction system drives shaft 54 and the scanning wheel at 800 rpm. The motor M and lamps 38 and 40 are powered by the small dry cell batteries 28, which may be of the conventional 1.5-volt variety.

As best seen in FIG. 4, in the illustrated embodiment wheel 52 is fabricated of two circular discs 52a and 52b each having six radially extending rectangular slots uniformly angularly distributed about its periphery, between which is sandwiched a circular disc aperture plate 52c having six rectangular apertures therein which are slightly smaller than the slots in discs 52a and 52b with which they are aligned. The apertures in disc aperture plate 52c, which may be photographic film on which the pattern of apertures has been developed, do not extend to the periphery of the disc and precisely define the shape, area, and location of six rectangular apertures through which light enters the system. The apertures are significantly wider than the slits in the scanning wheel shown in FIG. 6 of the aforementioned Kinzie and Gravereaux patent, being approximately 4.5 mm (0.177 inch) wide and 5.3 mm (0.2086 inch) long, thus allowing more light to enter than in the prior system; since the amount of light reflected from a soundprint illuminated with a small incandescent lamp is already limited, the resulting increase in the amount of light enhances the sensitivity of the system. The unacceptable response of the system to high frequencies that would otherwise result from such wide apertures is obviated by fitting a cylindrical lens 52d in each of the slots in disc 52a over the apertures in disc aperture plate 52c. The plate 52a is positioned above the soundprint surface at a distance equal to the focal length of lenses 52d. Light from lamps 38 and 40 illuminating the soundtrack surface is reflected off the printed medium (typically paper) in a Lambertian manner, with more reflected from the variable-area sound track than from the background. By virtue of the cylindrical lens, only one line of the illuminated soundprint surface contributes to the formation of a vertically oriented collimated beam of light from the upper surface of the lens. That is, the collimated beam is parallel to, but displaced from the rotational axis of disc 52a.

The collimated light beams transmitted by cylindrical lenses 52d are directed through a transparent arcuate-shaped window 70a in an otherwise opaque mask 70 and a spherical lens 72 which focuses the light to a point at which a photodetector 74 is positioned. Lens 72 is supported over an arcuate-shaped opening 58b in platform 58, and the mask 70, which may be a semi-circular sheet of photographic film which is opaque except for the window 70a, is pressed against the underside of platform 58 by an arcuate-shaped 76 which is secured to platform 58 by suitable means (not shown). Alternatively, the mask 70 may be placed immediately above lens 72 without affecting the operation of the system.

As seen in FIG. 5, a somewhat stylized plan view of the optical system looking downward from photodetector 74 and with platform 58 removed, the photodetector 74 is vertically aligned with the center of the arcuate-shaped window 70a in the mask (details of which will be described presently) which, in turn, is concentric with scanning wheel 52 and is positioned to lie intermediate the ends of cylindrical lenses 52d. It will be noted that window 70a has a length substantially equal to the angular distance between the focal axes of adjacent cylindrical lenses so that a given cylindrical lens, and the scanning line defined thereby, completely traverses the window 70a before the next following lens begins to traverse the window. In other words, and except for certain refinements to be described presently, the lenses 52d are spaced such that only a single aperture are at a time permits light to enter window 70a and a new aperture/lens begins traversal of the window just as the previous aperture is completing its traversal. The spherical lens 72 has an arcuate length sufficiently greater than the distance between two adjacent cylindrical lenses to assure that collimated light from a given cylindrical lens is focused onto the photodetector throughout its traversal of the window 70a. The scanning line defined by each cylindrical lens has a length equal to the width of window 70a and a very narrow width determined by the optics of the system.

Figure 6:
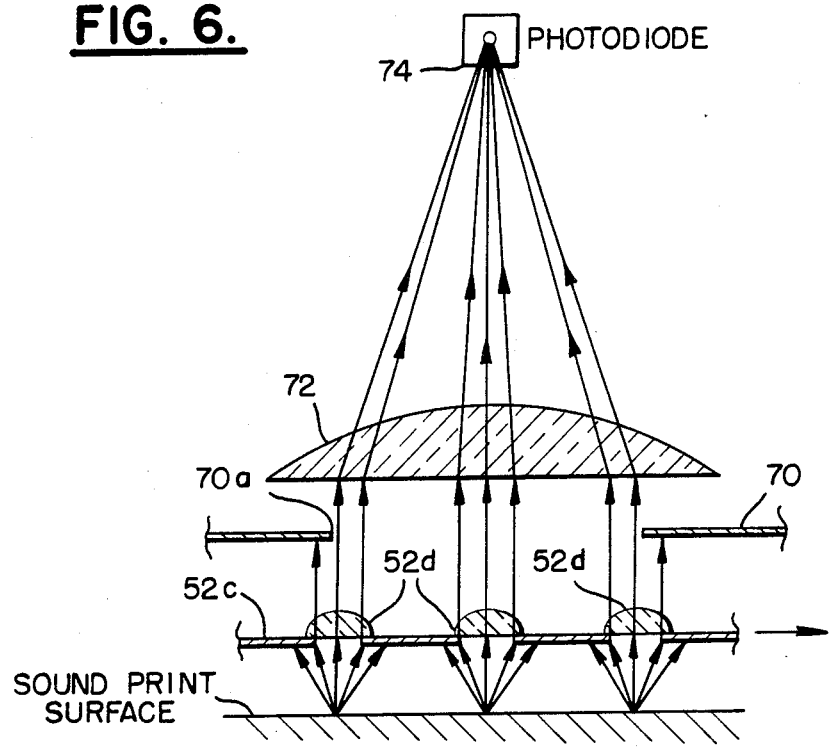
FIG. 6 is a somewhat stylized diagram of the optical system of the scanner of FIG. 3.

The side view of the optical system shown in FIG. 6 (which is not entirely accurate in that only two of the cylindrical lenses 52d can be seen in a "true" cross-sectional view) further illustrates the relative positioning of the cylindrical lenses 52d, the mask 70, the spherical lens 72 and the photodetector 74, which may be a semiconductor photodiode powered by the dry cell batteries 28. As has been noted earlier, a small area of the relatively more reflective soundprint is illuminated by lamps 38 and 40 and reflector 42, and a certain amount of the incident illumination is reflected from the soundprint surface; because of the roughness of the paper on which the sound track normally is printed, the incident light is substantially uniformly scattered in an approximately Lambertian field. As depicted in FIG. 6, some of the scattered light strikes the underside of disc aperture plate 52c (actually the underside of disc element 52b) and is returned toward the soundprint surface, and the balance enters the transparent apertures in aperture plate 52c. The light transmitted through these apertures, which arrives from many directions, is collimated into a beam by the cylindrical lens 52d, a portion of which passes through the window 70a in mask 70, the narrow dimension of the window being directed into the paper as viewed in FIG. 6. As the scanning wheel is rotated to cause the lens 52d to, in effect, move in the direction of the arrow, more and more of the right edge of the beam is cut off by the right extremity of the window 70a while at the same time more of the far left edge of the collimated beam is admitted through the window; throughout the scan the amount of the light reaching spherical lens 72 is limited by the width dimension of window 70a, which typically corresponds to the spacing between adjacent segments of the printed sound track which, in the present embodiment, is 0.05 inch. The light reaching spherical lens 72, regardless of the relative position of the cylindrical lens transmitting it, is focused on the point at which photodetector 74 is positioned.

Keeping in mind that FIG. 6 is not a true side view of the optical system, and, furthermore, that it is not drawn to scale, in the presently preferred embodiment, the optical elements are positioned relative to each other as follows: spacing between left and right cylindrical lenses—12 mm (0.5 in.); distance from soundprint surface to disc aperture plate 52c—11 mm (0.433 inch); distance from disc aperture plate 52c to mask 70 (which actually is in contact with the undersurface of spherical lens 72)—5 mm (0.197 inch); distance between undersurface of lens 72 and photodetector 74—51 mm (2.00 inches). It is to be understood that these spacings are by way of example only, and are subject to a certain amount of variation depending on the focal lengths of the lenses.

Figure 7:
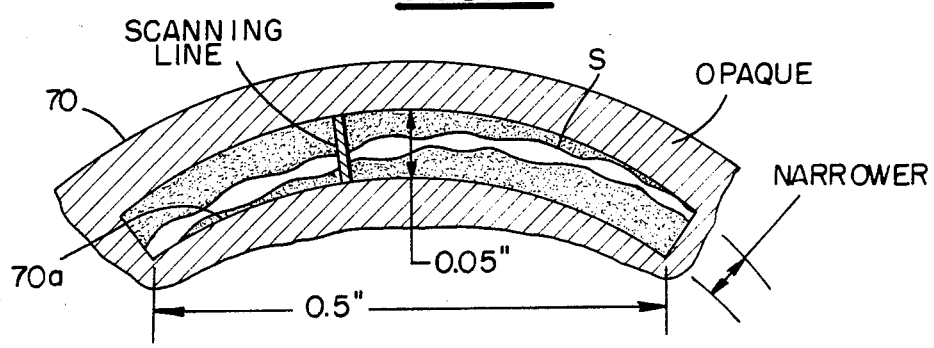
FIG. 7 is an enlarged fragmentary plan view of a mask used in the optical system of the scanner of FIG. 3.

Reverting now to a more detailed description of mask 70, particularly the properties of the window 70a, the basic configuration of the window is shown greatly enlarged in FIG. 7 as having an arcuate shape and defined by seemingly concentric circular arcs. Actually, in order that the optical apparatus accurately scan the sound track segments which, because the spacing between segments at the central axis 30 is slightly greater than the spacing at the outer extremities of the arcuate segments, window 70a likewise is made slightly wider in the central portion than at the ends. In a system designed to "read" one at a time sound track segments recorded with the geometry illustrated in FIG. 2, window 70a has a width of 0.05 inch at its central portion, a width of about 0.035 inch at the ends, and a length of 0.5 inch. It is within the contemplation of the invention that two adjacent sound track segments be "read" at the same time, in which case the mask 70 would have a window twice as wide, namely, 0.10 inch at the central portion and about 0.07 inch at the ends, but still having a length of one-half inch.

In operation, the player 16 is positioned over the sound track in the manner shown in FIG. 1 so that, ignoring the tilt of the track segments, the long edges of the window 70a in mask 70 are parallel to the track segments S of the folded printed sound track. The lamps 38 and 40 illuminate the group of sound track segments that lie below the aperture 36, FIG. 7 showing the type of scene that is "viewed" by the photodetector 74 through the arcuate window 70a as the scanning line, defined by one of the cylindrical lenses 52d, traverses window 70a from one end to the other. As has been noted earlier, the length of the scanning line is equal to the width of window 70a, namely, 0.05 inch in the embodiment of FIG. 7, and the effective width of the scanning slit, determined by the system optics and difficult to measure, is estimated to be of the order of 0.025 inch. In FIG. 7 the illustrated tilted sound track segment S happens to be the only one "visible" through window 70a and is approximately centrally located under the scanning line, but it will be appreciated that at times the photodetector will be "looking" at portions of two successive segments, and, also, a different portion of the scanning line will intercept the sound track as the player is moved in the manual scanning direction. In the present embodiment the scanning wheel 52 rotates at 800 rpm and, since there are six scans per wheel revolution (i.e., six apertures/cylindrical lenses) this means there are 4,800 scans per minute or 80 scans per second. Thus, each longitudinal track segment, typically one-half inch long with extensions of about 0.10 inch at either end, contains only 12.5 milliseconds of speech, so there is substantial waveform redundancy as between adjacent track segments, and it is not critical that individual segments be scanned independently. The output of photodetector 74, an electrical signal whose intensity varies with variations in the area of the sound track segments, which, as has been noted, are more reflective than the medium on which they are printed and are usually white printed on black, is preamplified by electronic circuitry mounted on a circuit board contained within housing 34, and then coupled via cable 20 to signal processing circuitry and an audio amplifier contained in remote console 22, the output of which is, in turn, coupled to loudspeaker 26.

Although the system thus far described faithfully reproduces sound information contained in the printed sound tracks, sufficiently that the character and inflection of the speaker's voice is preserved, the system inherently is subject to a certain amount of "scanning noise" which, for purposes of the present discussion, includes all possible kinds of noise that is or may be generated by the rotating scanning wheel 52; since there are 80 scans per second, the scanning noise occurs at 80 Hz and at higher harmonics thereof, and to a lesser extent at multiples of 80/6 Hz (as there are six lenses in the disc) plus intermodulation products. One possible source of noise is mismatch of the angular spacing between lenses 52d and of the lenses themselves; noise caused by these factors, which would occur when a given slit completes its scan of a sound track segment and the next following slit starts its scan, can be avoided by insuring an angular spacing between lenses of precisely 60° and closely controlling tolerances during fabrication of the lenses. Further, because of the arched and angled sound track segments, the mask 70 must be precisely oriented with respect to the sound track segments in order that the window 70a always sees one and only one track, or the equivalent of one track, during rotation of the scanning wheel from slit to slit. Any defects in the mask itself, or in its placement, or defects in the print, cause generation of low frequency noise components together with harmonics.

Figure 8:
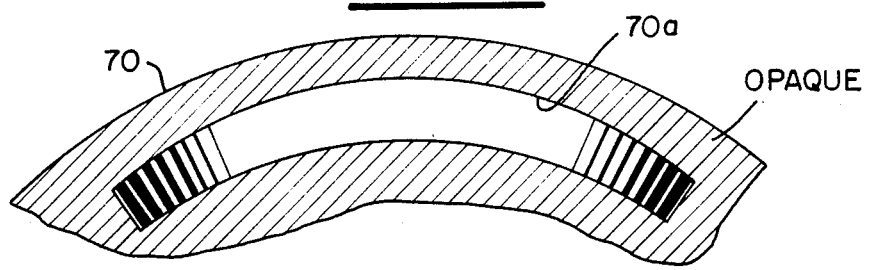
FIG. 8 is an enlarged fragmentary plan view of an alternative form of mask for the optical system of the scanner.

Other sources of noise are: non-uniform pickup along the length of a sound track segment, non-uniform illumination of the print, or inaccuracies in the manufacturing processes such as improper positioning of the photodetector, all of which can result in undesirable variations (noise) in the signal delivered by the photodetector. The alternative form of mask illustrated in FIG. 8 is effective to minimize scanning noise resulting from some misplacement of the rotating scanning wheel relative to the stationary mask 70 which might result in one or two things happening: (1) a given slit has left the window in the mask and the next following slit has not yet entered, or (2) a given slit has not yet finished scanning and the next successive slit has already started scanning. In both cases, with the mask shown in FIG. 7, there would either be zero light output for some short interval, or a jump to twice the amount of light for some time interval, both of which conditions would contribute to noise. The problem can be minimized by providing the approximation of a grey scale at either end of window 70a in the mask 70; although Eastman Kodak and others provide photographic grey scales in various configurations, the shape and extremely small size of the present mask, and the shape of the window, makes it difficult and impractical to employ a conventional commercially available grey scale. An acceptable approximation of a grey scale is achieved by altering the transparency of the end portions of window 70a, in step-wise fashion, in accordance with a pulse width modulation function that causes the transmittance to increase linearly from zero at the extremities to full transparency. In the disclosed embodiment, the approximated grey scale is achieved in eight steps using seven equally-spaced opaque bars of progressively decreasing width. The spacing between adjacent opaque bars is made an integral sub-multiple of the width of the cylindrical lens aperture so as to avoid the frequency interference which would otherwise be caused by such gratings. The purpose of the gratings at the ends of the track segments is to gradually reduce the sensitivity of the scanning line just entering a segment, thus reducing the scanning noise. This technique reduces the sensitivity of the system to misposition of the reader relative to the sound track and manufacturing tolerances.

Again, if a mask as illustrated in FIG. 7 is used for viewing the sound tracks, and parts of a sound track intended to be read are clipped in the process by the edges of the window as illustrated in FIG. 9, the result in the output of the photodetector will be unrecovered harmonic distortion. Such harmonic distortion can be reduced with a mask constructed in accordance with FIG. 10 wherein the long edges of the window 70a are provided with triangular-shaped teeth, each of a width equal to an integral sub-multiple of the width of the cylindrical lens aperture, and each row of teeth extending inwardly approximately one-fourth the width of window 70a. In effect, the teeth taper the intensity of the light picked up at the two edges of the window so as to diminish the effect of light information picked up from adjacent tracks and to thereby reduce harmonic distortion. The same grey scale considerations as at the ends of the mask apply.

It will be appreciated that the modifications separately illustrated in FIGS. 9 and 10 can both be incorporated in the scanning mask; that is, the window 70a may be stepped at its ends as shown in FIG. 8 and also have the teeth, shown in FIG. 10, disposed along its long edges. The width of each tooth, like the spacing between the bars in the configuration of FIG. 8 is an integral sub-multiple of the width of the cylindrical lens aperture; because there are an integral number of teeth within the aperture of a cylindrical lens, no noise is generated by the presence of the triangular teeth.

Whichever of the described configurations of the window 70a is used, the mask is conveniently fabricated from high-contrast photographic film. The bar gratings and/or teeth can be generated by an x-y plotter under control of a computer program, or other suitable methods.

Figure 11:
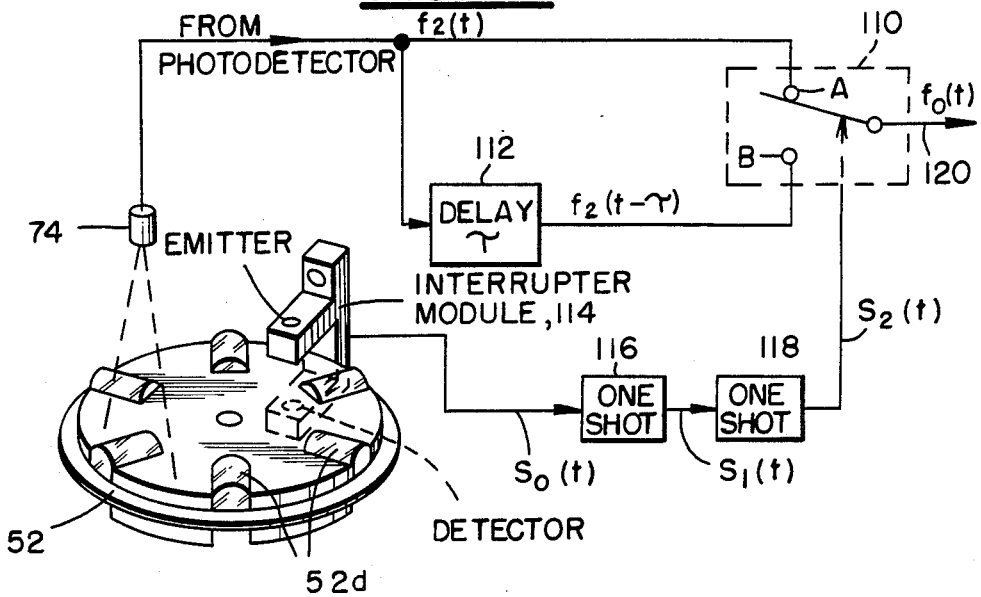
FIG. 11 is a block diagram of a circuit useful in the signal processing portion of the system.
Figure 11A:
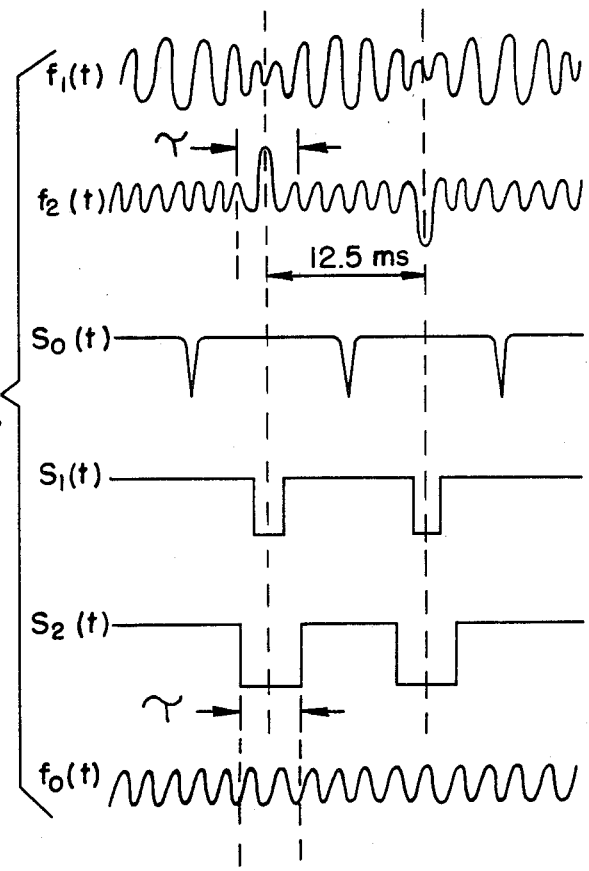
FIG. 11A is a plot of waveforms useful in explaining the operation of the circuit of FIG. 11.

Scanning noise and modulation distortion can be further reduced by suitably processing the electrical signals produced by the photodetector before they are converted to audible sounds. Referring to FIG. 11A, waveforms $f_1(t)$ and $f_2(t)$ are representative of two possible electrical signals produced by the scanner, the first exhibiting attenuation of the signal at the ends of the sound track segments and the other exhibiting disturbances at the transition from one scanning line to the next caused by the factors discussed above; in the present embodiment, the transitions are separated by 12.5 milliseconds. The deleterious effect of these disturbances can be significantly reduced by the system shown in FIG. 11 which functions to discard a portion of the signal that carries most of the noise and to replace it with a "clean" signal.

An electrical signal produced by photodetector 74, which, by way of example, may wave the waveform $f_2(t)$, is applied to one contact, labeled A, of an electronic switch, diagrammatically shown at 110, and also to the input of a delay line 112 having a delay period of $\tau$, in the range of two to five milliseconds. The delayed signal is applied to a second contact B of switch 110. The switch contactor is normally connected to contact A so as to couple the input signal $f_2(t)$ to an output line 120, and is cyclically switched at a 80 Hz rate to contact B for a period substantially equal to the period $\tau$. The switching rate and duration are conveniently established by mounting an optical interrupter module 114, such as the Type H21AS commercially available from General Electric Company, at the periphery of the rotating scanning wheel 52 of the scanning apparatus with its emitter on one side and the detector on the other, so as to produce an output pulse each time a cylindrical lens 52d passes through the interrupter. The module 114 preferably is positioned diametrically opposite that portion of the scanning wheel which is optically aligned with the photodetector so as to cause the output pulses to occur equidistantly from successive signal transitions, as shown in waveform $S_0(t)$ of FIG. 11A. This pulsed signal is applied to a one-shot circuit such as a Type 556 integrated circuit available from National Semiconductor, for adjusting the timing of the pulses so as to occur at the transition times (waveform $S_1(t)$). This signal is further processed by application to another one-shot circuit 118 which adjusts the pulses to have a desired width $\tau$, corresponding to the delay of delay line 112, namely, in the range between two and five milliseconds. The resulting (waveform $S_2(t)$) is applied to and controls switch 110 to switch the contactor between contacts A and B.

When the contactor engages contact A the signal $f_2(t)$ passes unaffected to the output line 120, and when the contactor engages contact B the same signal delayed by the time $\tau$, which is programmable and made equal to the width of the pulses in waveform $S_2(t)$, is passed to the output line. Switching is preferably done at or close to a zero-crossing of the $S_2(t)$ signal so as to avoid generating other phase modulation and noise. The resulting signal $f_0(t)$ is essentially free of noise as a consequence of ignoring, by deletion, the portion of the signal that carries most of the noise. The described technique can be used with speech and other slowly varying signals in which the information content changes slowly with time. The length of a phoneme in normal speech being about forty to fifty milliseconds, significantly longer than the two to five milliseconds during which the information that occurred two to five milliseconds before is repeated, the "substitution" is hardly perceptible to the ear.

Figure 12:
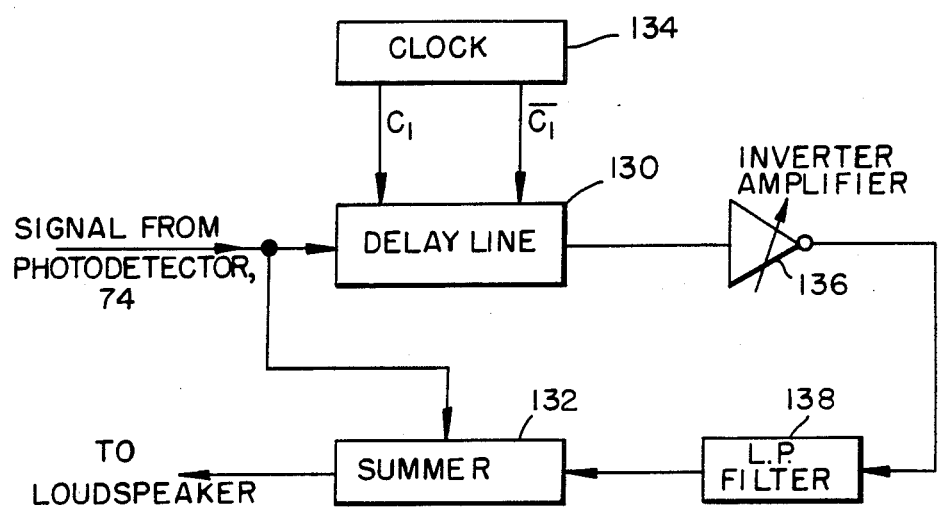
FIG. 12 is a block diagram of an alternative circuit useful in the signal processing portion of the system.

An alternative circuit for reducing scanning noise in the signal produced by the photodetector is the comb filter arrangement shown in FIG. 12 designed to have nulls or notches at the scanning frequency and harmonics thereof, namely, at 80 Hz, 160 Hz, 240 Hz and so on preferably up to 2 KHz, at which (in the disclosed embodiment) frequency components of the scanning noise appear. Thus, the function of the comb filter is to eliminate the unwanted noise components from the transduced signal before it is audibly reproduced.

Figure 12A:
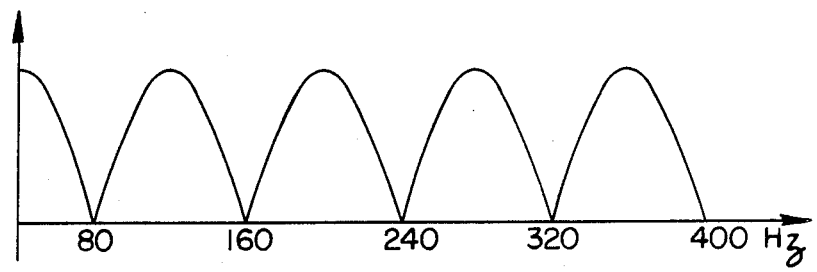
FIG. 12A is a plot of the characteristic of the filter of FIG. 12.

The signal from photodetector 74, which may have "noisy" transitions separated by about 12.5 milliseconds, is applied to a delay line 130 designed to delay the signal by 12.5 milliseconds, and is also applied to one input of a summer 132 in which delayed and inverted and undelayed versions of the signal are summed to generate at the output of the summer the frequency response shown in FIG. 12A. Delay line 130 may be an analog delay line such as the Reticon Type SAD 1024, commercially available from Radio Shack or equivalent devices from other manufacturers, through which sampled electrical representations of the amplitude of the input signal are shifted progressively from input to output under control of a clocking oscillator 134, thus delaying the signal. The timing of the shifting function is controlled by trigger pulses from the clock oscillator 124, two clock cycles being required to shift a signal sample from one storage site to the next. In the present application only 512 of the 1,024 storage sites available in the Type 1024 delay line are used, so in order to provide a delay of 12.5 milliseconds at a frequency of 80 Hz, the clock frequency is 20,480 Hz. In order to insure that the nulls in the response characteristic occur exactly at the transitions, the clock pulses are preferably synchronized with the scanning wheel 52 and may be synthesized by detecting the angular velocity of the scanning wheel, using electro-optical means such as the interrupter described above, and multiplying the generated pulses by the appropriate factor to derive the correct clock frequency. The delay signal is suitably amplified and inverted by an inverter amplifier 136, and then filtered in a low pass filter 138 to remove any modulation introduced by the clocking oscillator and applied to the second input of summer 132. The output signal from the summer, in which scanning noise components are reduced by about 15 to 20 db, is applied to the loudspeaker for reproduction.

Figure 2:
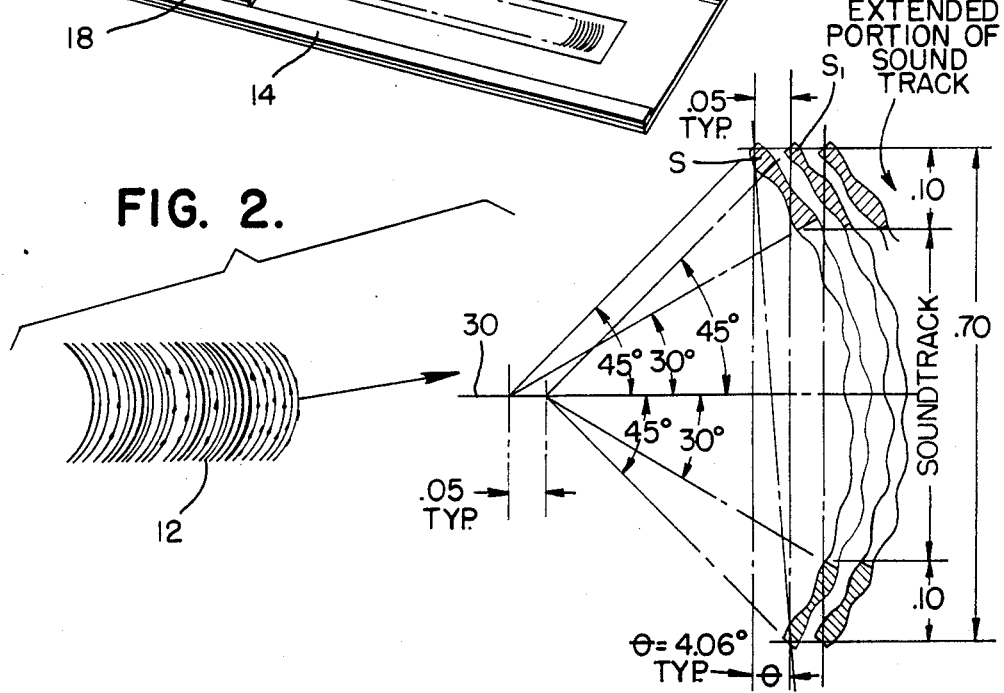
FIG. 2 is a fragmentary view of a sound track showing the segments making up the track, the enlarged right-hand portion showing the geometry of the sound track.

FIG. 13 is a functional block diagram of a suitable system for plotting a sound track having the geometry illustrated in FIG. 2. The speech message appropriate to the illustration on the page 10 is initially recorded on a suitable audio recording medium such as an audio tape recorder 90, and the reproduced signal is subjected to conventional signal processing techniques such as amplitude compression 92 and pre-emphasis 94. The precessed audio signal is digitized in an analog-to-digital (A/D) converter 96, which may be contained in a minicomputer 98, such as a PDP-11/34, and entered into the mass memory of the computer, which usually is in the form of a hard disk. In order to determine whether the signal stored in memory is suitable for further processing it is retrieved and converted to analog form by a digital-to-analog (D/A) converter 100 and reproduced by a suitable loudspeaker 102; waveform editing can be used at this stage.

Once it is determined that the stored signal is acceptable, a series of software signal processing routines are performed on the data to put it in a format suitable for plotting. As indicated in FIG. 10, these routines include: (1) customized compression of signal amplitude; (2) extension of both ends of each segment with a redundant sound information; (3) controlled-carrier amplitude modulating the signal (i.e., carrier is controlled in amplitude in such a way that the modulation is close to 100% at all times), which may result in the omission of some track segments in the final plot, as shown in the left-hand portion of FIG. 2; and (4) formatting the signal by segmentation of the signal data into short time frames for establishing the individual sound track segments.

The computer also contains software for controlling an x-y plotter 104 such as the commercially available Hewlett-Packard HP 9872, this software including the elementary plotting routines that are furnished with the plotter and a series of customized routines for plotting the processed signal data to achieve the geometry shown in FIG. 2. The customized plotting routines include: (1) instructions to plot the track segments determined by the signal processing routines; (2) folding of the sound track segments so as to produce signals representing continuous audio information when the segments are consecutively scanned longitudinally; (3) curving or arching the segments so as to comprise an arc of a circle of predetermined radius; (4) tilting the segments so that the lower extremity of a given segment is displaced in the scanning direction from its upper extremity by an amount equal to the nominal spacing between adjacent segments; and (5) since the plot is made with a thin pen using conventional ink which lays down a line of finite width, analyzing the effect of line width on the resolvability of the plot and controlling the movement of the plotting pen accordingly to maximize the resolution of the recorded sound information and minimize distortions resulting from a finite pen width. In a preferred implementation of the described method the curved, tilted sound track segments are recorded on the paper of plotter 104 four times the final actual size for improving the resolution, and a photographic reduction technique is used to arrive at the final format. An off-set printing technique is employed to apply the sound track to paper or other suitable medium.

Although the invention has been described with reference to a particular embodiment, it will now be appreciated that variations are possible without departing from the spirit and scope of the invention defined by the appended claims.

We claim:

1. Apparatus for scanning a "folded" sound track of the variable-area type printed on a surface and oriented in a manual scanning direction, the sound track consisting of a multiplicity of equal-length sound track segments oriented generally transverse the manual scanning direction and arranged in an order to represent sequential portions of a continuous sound track, each of said segments being an arc of a circle of predetermined radius centered on an imaginary line disposed in said manual scanning direction, said scanning apparatus comprising:

a housing having a flat bottom adapted to rest on said surface for manual movement over said sound track in the manual scanning direction, said bottom having an aperture therein;

means mounted within said housing for directing light through said aperture for illuminating an area of the printed sound track which is under said aperture;

means within said housing for performing a periodic scan along the length dimension of said sound track segments, said means comprising a scanning wheel supported for rotation in a plane substantially parallel to said sound track surface and closely adjacent the aperture in the bottom of said housing, said wheel having a plurality of apertures uniformly angularly spaced along a circle having substantially said predetermined radius each supporting a cylindrical lens therein, each said lens for collimating light reflected thereonto from the portion of the sound track which is under and is illuminated through the aperture in the bottom of said housing, means for rotating said scanning wheel, photodetector means supported within said housing for converting light incident thereon to an electrical output signal, a mask supported between said scanning wheel and said photodetector means having formed therein a narrow arcuate light-transmitting window having a radius of curvature substantially equal to said predetermined radius and a length comparable to the length of said segments and to the angular spacing between the apertures in said scanning wheel, said window being aligned with said circle and oriented substantially parallel to said sound track surface so as to transmit light transmitted by the cylindrical lenses in said scanning wheel apertures, each said scanning wheel aperture and associated lens defining a scanning line which traverses said window as said scanning wheel is rotated, and a spherical lens supported between said mask and said photodetector means for focusing onto said photodetector means light transmitted through the window in said mask; and means for converting an output signal from said photodetector means into audible sound.

2. Apparatus according to claim 1, wherein the end portions of the arcuate window in said mask are narrower than the intermediate portion between said end portions.

3. Apparatus according to claim 2, wherein the width of the intermediate portion of said window is substantially equal to the spacing between adjacent segments of said printed sound track.

4. Apparatus according to claim 2, wherein the width of the intermediate portion of said window is substantially equal to the space occupied by two adjacent segments of said printed sound track.

5. Apparatus according to claim 2, wherein the end portions of said window approximate a photographic grey scale for inwardly tapering the intensity of the light transmitted by said end portions for reducing the scanning noise.

6. Apparatus according to claim 5, wherein the grey scale at each end portion of the window comprises a plurality of equally-spaced opaque bars of progressively decreasing width extending transversely of the window, and wherein the spacing between adjacent bars is an integral sub-multiple of the width of the aperture of the cylindrical lenses in said scanning wheel.

7. Apparatus according to claim 6, wherein portions of said mask adjacent the long edges of said window approximate a photographic grey scale for inwardly tapering the intensity of the light transmitted by said edge portions.

8. Apparatus according to claim 7, wherein the grey scale at each of the long edges of said window comprises a plurality of triangular shaped teeth distributed along said edge each having a width equal to an integral sub-multiple of the width of the aperture of the cylindrical lenses in said scanning wheel.

9. Apparatus according to claim 2, wherein portions of said mask adjacent the long edges of said window approximate a photographic grey scale for inwardly tapering the intensity of the light transmitted by said edge portions for reducing harmonic distortion.

10. Apparatus according to claim 9, wherein the grey scale at each of the long edges of said window comprises a plurality of triangular-shaped teeth distributed along said edge having a width equal to an integral sub-multiple of the width of the aperture of the cylindrical lenses in said scanning wheel.

11. Apparatus according to claim 9, wherein the end portions of said window approximate a photographic grey scale for inwardly tapering the intensity of the light transmitted by said end portions.

12. Apparatus according to claim 1, wherein the means for converting the output signal from the photodetector into audible sound comprises
a loudspeaker, and
a signal processing circuit means connected between said photodetector and said loudspeaker including means for selectively eliminating scanning noise components from the said output signal.

13. Apparatus according to claim 12, wherein said last-mentioned means includes
switch means having a contactor and first and second contacts to which the said output signal and said output signal delayed by a predetermined period are respectively applied, and
means responsive to the rotation of said scanning wheel for cyclically switching the contactor of said switch means from the first to the second contact at a rate proportional to the speed of rotation of said scanning wheel for substantially said predetermined period.

14. Apparatus according to claim 13, wherein said last-mentioned means includes an interrupter positioned at the periphery of said scanning wheel and operative to produce a pulse for controlling said switching means each time an aperture in said scanning wheel is rotated past said interrupter.

15. Apparatus according to claim 12, wherein said last-mentioned means includes a comb filter having a response characteristic so as to significantly reduce scanning noise components in the signal applied to the loudspeaker.

16. Apparatus for scanning a "folded" sound track of the variable-area type printed on a surface and oriented in a manual scanning direction, the sound track consisting of a multiplicity of equal-length sound track segments oriented generally transverse the manual scanning direction and arranged in an order to represent sequential portions of a continuous sound track, each of said segments being an arc of a circle of predetermined radius centered on an imaginary line disposed in said manual scanning direction, said scanning apparatus comprising:
a housing having a base with a flat bottom surface adapted to rest on said sound track surface for manual movement over said sound track in the manual scanning direction, said base having an aperture therethrough;
a light source mounted within said housing for directing light through said aperture for illuminating an area of the printed sound track which is under said aperture;
means within said housing for performing a periodic scan along the length dimension of said sound track segments, said means comprising
a scanning wheel supported for rotation in a plane substantially parallel to said sound track surface and closely adjacent the aperture in the base of said housing, said wheel having a plurality of apertures uniformly angularly spaced along a circle having substantially said predetermined radius each supporting a cylindrical lens therein, each said lens for collimating light reflected thereonto from the portion of the sound track which is illuminated by said light source,
means for rotating said scanning wheel at a selected rate,
photodetector means supported above said scanning wheel for converting light incident thereon to an electrical output signal,
a mask supported between said scanning wheel and said photodetector means having formed therein a narrow arcuate light-transmitting window having a radius of curvature substantially equal to said predetermined radius and a length comparable to the length of said segments and to the angular spacing between the apertures in said scanning wheel, the end portions of said window being narrower than the intermediate portion between said end portions and approximate a photographic grey scale for inwardly tapering the intensity of the light transmitted by said end portions for reducing scanning noise, and the long edges of said window each having a plurality of triangular-shaped teeth distributed therealong having a width equal to an integral sub-multiple of the width of the aperture of said cylindrical lenses which approximate a photographic grey scale for inwardly tapering the intensity of light transmitted by the edge portions of said window for reducing harmonic distortion, said window being vertically aligned with said circle and oriented substantially parallel to said sound track surface so as to transmit light transmitted by the cylindrical lenses in said scanning wheel apertures, each said scanning wheel aperture and associated lens defining a scanning line which traverses said window as said scanning wheel is rotated, and a spherical lens supported between said mask and said photodetector means for focusing onto said photodetector means light transmitted through the window in said mask; and means for converting an output signal from said photodetector means into audible sound.

17. Apparatus according to claim 16, wherein the grey scale at each end portion of the window comprises a plurality of equally-spaced opaque bars of progressively decreasing width extending transversely of the window, and wherein the spacing between adjacent bars is an integral sub-multiple of the width of the aperture of the cylindrical lenses in said scanning wheel.

18. Apparatus for scanning a "folded" sound track of the variable-area type printed on a surface and oriented in a manual scanning direction, the sound track consisting of a multiplicity of equal-length sound track segments oriented generally transverse the manual scanning direction and arranged in an order to represent sequential portions of a continuous sound track, each of said segments being an arc of a circle of predetermined radius centered on an imaginary line disposed in said manual scanning direction, said scanning apparatus comprising:

a housing having a flat bottom adapted to rest on said surface for manual movement over said sound track in the manual scanning direction, said bottom having an aperture therein;

a light source mounted within said housing for directing light through said aperture for illuminating an area of the printed sound track which is under said aperture;

means within said housing for performing a periodic scan along the length dimension of said sound track segments, said means comprising a scanning wheel supported for rotation in a plane substantially parallel to said surface, said wheel including a plurality of apertures uniformly angularly spaced along a circle having substantially said predetermined radius and each supporting a cylindrical lens therein, each said lens for transmitting light reflected thereonto from the portion of the sound track which is under said aperture, photodetector means for converting light incident thereon to an electrical output signal, means for rotating said scanning wheel, and means supported between said scanning wheel and said photodetector means including a mask having formed therein a narrow arcuate light-transmitting window having a radius of curvature substantially equal to said predetermined radius and a length comparable to the length of said segments and to the angular spacing between the apertures in said scanning wheel, said window being vertically aligned with said circle and oriented substantially parallel to said sound track surface so as to transmit light transmitted by said scanning wheel apertures, each said scanning wheel aperture defining a scanning line which traverses said window as said scanning wheel is rotated; and means for converting an output signal from the photodetector means into audible sound, said converting means comprising a loudspeaker, and signal processing means connected between said photodetector means and said loudspeaker including switch means having a contactor and first and second contacts to which the said output signal and said output signal delayed by a predetermined period are respectively applied, and means responsive to the rotation of said scanning wheel for cyclically switching the contactor of said switch means from the first to the secnd contact at a rate proportional to the speed of rotation of said scanning wheel for substantially said predetermined period.

19. Apparatus according to claim 18, wherein said last-mentioned means includes an interrupter positioned at the periphery of said scanning wheel and operative to produce a pulse for controlling said switching means each time an aperture in said scanning wheel is rotated past said interrupter.

* * * * *